US008892953B2

United States Patent
Fröhlich et al.

(10) Patent No.: US 8,892,953 B2
(45) Date of Patent: Nov. 18, 2014

(54) METHOD AND SYSTEM FOR TEST SUITE CONTROL

(75) Inventors: Joachim Fröhlich, München (DE); Guy Collins Ndem, München (DE)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 13/549,871

(22) Filed: Jul. 16, 2012

(65) Prior Publication Data

US 2013/0019126 A1 Jan. 17, 2013

(30) Foreign Application Priority Data

Jul. 15, 2011 (EP) .................................... 11174146

(51) Int. Cl.
*G06F 11/00* (2006.01)
*G06F 11/36* (2006.01)

(52) U.S. Cl.
CPC .................................. *G06F 11/3688* (2013.01)
USPC ............................. 714/38.1; 714/25; 714/48

(58) Field of Classification Search
USPC ........................ 714/38.1, 25, 38.13
See application file for complete search history.

(56) References Cited

U.S. PATENT DOCUMENTS

| | | | |
|---|---|---|---|
| 2002/0091968 A1* | 7/2002 | Moreaux et al. | 714/38 |
| 2003/0167422 A1* | 9/2003 | Morrison et al. | 714/38 |
| 2007/0094541 A1 | 4/2007 | Kang | 714/38.1 |
| 2008/0010542 A1* | 1/2008 | Yamamoto et al. | 714/38 |
| 2008/0222454 A1 | 9/2008 | Kelso | 714/38.14 |
| 2009/0204848 A1* | 8/2009 | Kube et al. | 714/25 |
| 2009/0254885 A1 | 10/2009 | Arieli et al. | 717/125 |
| 2011/0035629 A1* | 2/2011 | Noller et al. | 714/38.14 |

OTHER PUBLICATIONS

European Search Report and Written Opinion, Application No. 11174146.8, 8 pages, Mar. 19, 2012.

* cited by examiner

*Primary Examiner* — Sarai Butler
(74) *Attorney, Agent, or Firm* — King & Spalding L.L.P.

(57) ABSTRACT

Methods and systems are provided for computer software testing using test suite data. A method may include defining a plurality of testing goals and a testing strategy for the code of the software application, determining objects under test within said code of a software application, designing test cases and test suites for said defined testing strategy, defining test categories for said designed test suites, defining a test execution sequence for said designed test suites and said test categories, defining whether a test execution sequence shall continue or stop after an error in a test object or a fail event in the test system, based on the results of the previous steps, parametrizing a test automation framework with the test suites, running the test automation framework on said code of a software application, and analyzing the results obtained from running the test automation framework on said code of a software application.

9 Claims, 2 Drawing Sheets

METHOD AND SYSTEM FOR TEST SUITE CONTROL

CROSS-REFERENCE TO RELATED APPLICATIONS

This application claims priority to EP Patent Application No. 11174146.8 filed Jul. 15, 2011. The contents of which is incorporated herein by reference in its entirety.

TECHNICAL FIELD

The present disclosure relates generally to software processing, and more particularly, to a method and a system for improving computer software testing using test suite control data.

BACKGROUND

In computer programming, by "unit testing" is understood a software verification and validation method for checking whether individual units of source code are fit for use. A "unit" is the smallest testable part of a software application. For example, in procedural programming a unit is an individual function or procedure. A unit test provides a strict, written contract that the unit under test must satisfy. The goal of unit testing is to show that the individual parts (units) of the application software are correct when ran in isolation. Usually, a unit test must satisfy code coverage criteria (often Statement or Branch).

Unit testing is considered a fundamental step for developing modern software of high quality.

A unit test suite is organized by means of attributes, assertions and constraints. The execution of a set of unit tests can be controlled by means of attributes. The assertions and constraints affect the calculation of individual test case verdicts (test case passes or test fails), attributes support, such as the organization of sets of test cases (called test suites) and the automatic provision of test data to test cases.

Currently, unit tests are always executed to the last test case even if errors or fail events occur or have occurred during the execution, where the errors or fail events suggest stopping the test suite immediately. Moreover, tests are executed in an undefined (implementation-specific) order. However, often after errors or fails, the remaining test cases may be invalid because they depend logically on test cases running before and obviously affect the final test outcome. Performing the complete test run translates into wasted time and blocks test machines, requires undue use of memory (for storing test results), or even leads to damage of test machines. Therefore, it is important to control the execution of sets of unit tests.

Moreover, it is important to control the execution order of test cases within a test suite and to solve the issue of test category combination. Test cases are executed sequentially, in parallel or randomly. Furthermore, the set of tests to be executed are restricted or extended in order to meet situation-dependent test goals and project constraints and hence also obey economic constraints goals.

While existing test automation frameworks, languages and associated tools support the development and automatic execution of single test cases, the support for organizing and executing test suites (each combining several test cases or complete test suites) is rather rudimentary. Up to now the unit test control issues listed above are usually approached by verbose and error-prone imperative programming, often in an ad-hoc manner.

Test developers skilled in the art of testing are used to program test cases but have problems programming test suites, i.e. selecting, sequencing and controlling test suites and performing overall test control. Most times, test developers mix statements controlling test cases with statements controlling test suites, leading therefore to test specifications that are hard to understand, verify, maintain and apply.

Because of the difficulties in selecting the proper set of test cases and test suites, almost all the available tests are selected for a test run. Each test case checks, usually at several places in the test code, whether the test case is applicable or not. These checks are test control code which are not mixed with other code. If mixed, a test specification that is hard to understand results.

It is of special importance how the test case verdicts (pass, fail) affect the test execution sequence. Currently, the only solution to this constraint is to have only one test case per test suite (TextFixture) and to sequence the test suites outside the unit test framework. This can be achieved manually or by a script (batch file) controlling the execution of arbitrary programs on the command line.

Manual execution of test suites is not a solution because, due to the huge amount of unit tests, the unit tests are executed automatically on a daily, weekly or other periodic basis, and approaching the test control issue with a script in one of the diverse scripting languages and language variants is a paradigm discontinuity, depends on the properties the unit test tool allows to control and observe at the proprietary tool's interface, and, perhaps most important of all, is to be done in an imperative manner instructing the test tool, i.e. test execution engine, step-by-step what to do.

It is also important to execute the test cases and test sets in logical sequence. Currently this constraint is often solved by naming conventions with the intention to execute the test cases in alphanumeric order. However, there are no guarantees that different test execution engines or even two variants of the same execution engine consider the test names for scheduling (sequencing) the individual test cases.

The selection of test cases to be run by combining test categories is as well of importance. Currently it is not possible to combine test categories with unit test tools in a meaningful way. Only tests of one category can be executed at a time. Two or more test categories can be selected only in the sense of list concatenation with implementation-dependent execution sequence wherein the list order is undefined.

SUMMARY

In one embodiment, a method for testing software using test suites includes: defining a plurality of testing goals and a testing strategy for the software; determining a plurality of objects under test within said software; designing a plurality of test cases, and a plurality of test suites for said defined testing strategy; defining a plurality of test categories for said designed plurality of test suites; defining a test execution sequence for said designed plurality of test suites, and said defined plurality of test categories; deciding whether a test execution sequence shall continue or stop after the occurrence of at least one of an error in a test object and a fail event in the test system;
parametrizing a test automation framework with the test suites; running the test automation framework on said software under test, and analyzing the results obtained from running the test automation framework on said software.

In a further embodiment, said test automation framework employs a test control parameter capable of controlling where in the software a test execution engine (TEE) continues execution of a test after a problem is detected in a test suite of said plurality of test cases. In a further embodiment, said test automation framework employs a test order parameter capable of controlling a sequence of test cases in software. In a further embodiment, said test automation framework employs a test categories parameter capable of grouping test cases according to different criteria, where one test case can belong to one or more test categories. In a further embodiment, said test automation framework employs a set of precedence rules capable of defining which specification takes precedence between overlapping testing specifications.

In another embodiment, an electronic data processing system for testing software by using test suites includes: a functional component having: means for defining a plurality of testing goals and a testing strategy for the software; means for determining a plurality of objects under test within said software; means for designing a plurality of test cases, and a plurality of test suites for said defined testing strategy; means for defining a plurality of test categories for said designed plurality of test suites; means for defining a test execution sequence for said designed plurality of test suites, and said defined plurality of test categories; means for deciding whether a test execution sequence shall continue or stop after the occurrence of at least one of an error in a test object and a fail event in the test system; means for parametrizing a test automation framework with the test suites; means for running the test automation framework on said code of a software under test, and means for analyzing the results obtained from running the test automation framework on said software.

In a further embodiment, said functional component is a test execution engine (TEE).

In another embodiment, a computer program product usable for testing software by using test suites includes: a computer useable medium including a computer readable program, wherein the computer readable program includes a functional component that when executed on a computer causes the computer to perform the steps of: defining a plurality of testing goals and a testing strategy for the software; determining a plurality of objects under test within said software; designing a plurality of test cases, and a plurality of test suites for said defined testing strategy; defining a plurality of test categories for said designed plurality of test suites; defining a test execution sequence for said designed plurality of test suites, and said defined plurality of test categories; deciding whether a test execution sequence shall continue or stop after the occurrence of at least one of an error in a test object and a fail event in the test system; parametrizing a test automation framework with the test suites; running the test automation framework on said software under test, and analyzing the results obtained from running the test automation framework on said software.

In a further embodiment, said functional component is a test execution engine (TEE) for controlled execution of test suites. In a further embodiment, said test execution engine comprises at least test control parameters. In a further embodiment, said test execution engine is capable of executing test cases in a sequence defined in test execution plans.

In another embodiment, a test suite interface specification includes: a plurality of test control parameters capable of controlling whether a test execution engine continues or stops execution of tests after a problem is detected in a test suite; a test order parameter capable of controlling a sequence of test cases in a tested software; a test categories parameter capable of grouping test cases according to different criteria, where one test case can belong to one or more test categories, and a set of precedence rules capable of defining which specification takes precedence between overlapping test specifications.

In a further embodiment, an execution order of said test cases is one of random, alphanumeric and undefined. In a further embodiment, In a further embodiment, a plurality of test management commands are used for the test execution engine. In a further embodiment, said test management commands are written syntactically in the same language as one of the test cases, as the arguments for the test execution engine at the command line, and in configuration files.

BRIEF DESCRIPTION OF THE DRAWINGS

Example embodiments will be explained in more detail below with reference to figures, in which.

DETAILED DESCRIPTION

Figure 1:
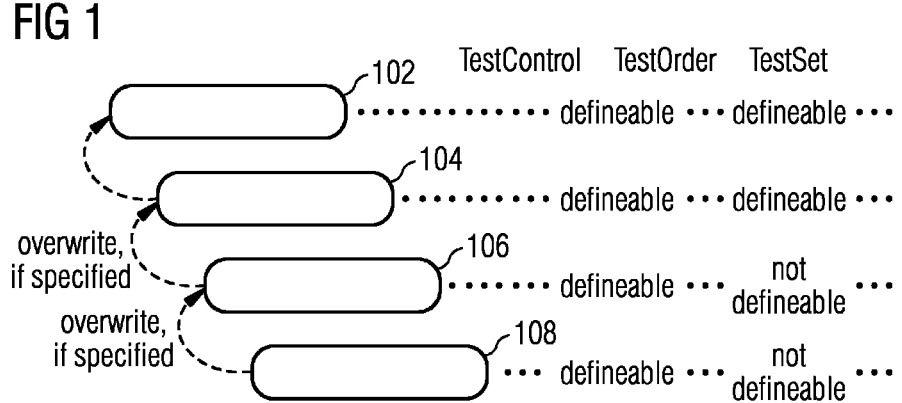
FIG. 1 represents Test Control parameters and Test Order parameters at various levels.

To summarize, in view of the above referenced problems, at least the following problems still need to find solutions: how to control the execution flow of unit test suites, while test system resources are conserved. Further, a solution to the above referenced problems should be easy to handle, and be suitable to be applied to tests of different types (test of functional properties or non-functional properties) operating at different system levels, like component tests, integration tests or system tests.

The present disclosure provides systems and methods that employ a declarative, easy to handle test suite control parameter. Such systems and methods may even be applied to tests of different types (test of functional properties or non-functional properties) operating at different system levels, e.g., component tests, integration tests or system tests.

One embodiment provides a method for testing a code of a software application by using test suites, the method comprising the steps of defining a plurality of testing goals and a testing strategy for the code of the software application, determining a plurality of objects under test within said code of a software application, designing a plurality of test cases, and a plurality of test suites for said defined testing strategy, defining a plurality of test categories for said designed plurality of test suites, defining a test execution sequence for said designed plurality of test suites and said plurality of test categories, defining whether a test execution sequence shall continue or stop after the occurrence of at least one of an error in a test object and a fail event in the test system, based on the results obtained in all the previous steps, parametrizing a test automation framework with the test suites, running the test automation framework on said code of a software application, and analyzing the results obtained from running the test automation framework on said code of a software application.

In one embodiment of the method for testing a software the test automation framework employs a test control parameter capable of controlling where in a software application a test execution engine (TEE) continues execution of a test after a problem is detected in a test suite. The test automation framework employs a test order parameter capable of controlling a sequence of test cases in the software. The test automation framework employs a test categories parameter capable of grouping test cases according to different criteria, where one test case can belong to one or more test categories. The test automation framework employs a set of precedence rules capable of defining which specification takes precedence between overlapping specifications.

Another embodiment provides an electronic data processing system for testing software by using test suites, comprising a functional component having means for defining a plurality of testing goals and a testing strategy for the code of the software application, means for determining a plurality of objects under test within said code of a software application, means for designing a plurality of test cases, and a plurality of test suites for said defined testing strategy, means for defining a plurality of test categories for said designed plurality of test suites, means for defining a test execution sequence for said designed plurality of test suites and said plurality of test categories, means for defining whether a test execution sequence shall continue or stop after the occurrence of at least one of an error in a test object and a fail event in the test system, means for parametrizing a test automation framework with the test suites, means for running the test automation framework on said code of a software application, and means for analyzing the results obtained from running the test automation framework on said code of a software application.

The functional component may be a test execution engine.

A further embodiment provides a computer program product usable for testing software by using test suites, comprising a computer useable medium including a computer readable program, wherein the computer readable program includes a functional component that when executed on a computer causes the computer to perform the steps of defining a plurality of testing goals and a testing strategy for the code of the software application, determining a plurality of objects under test within said code of a software application, designing a plurality of test cases, and a plurality of test suites for said defined testing strategy, defining a plurality of test categories for said designed plurality of test suites, defining a test execution sequence for said designed plurality of test suites and said plurality of test categories, defining whether a test execution sequence shall continue or stop after the occurrence of at least one of an error in a test object and a fail event in the test system, based on the results obtained in all the previous steps, parametrizing a test automation framework with the test suites, running the test automation framework on said code of a software application, and analyzing the results obtained from running the test automation framework on said code of a software application.

The computer program product usable for testing the functional component may comprise a test execution engine (TEE) for controlled execution of test suites. The test execution engine comprises at least test control parameters. The test execution engine may be capable of executing test cases in a sequence defined in test execution plans.

Another embodiment provides a test suite interface specification, comprising a plurality of test control parameters capable of controlling whether a test execution engine continues or stops execution of tests after a problem is detected in a test suite, a test order parameter capable of controlling a sequence of test cases in said codes of the software application, a test categories parameter capable of grouping test cases according to different criteria, where one test case can belong to one or more test categories, and a set of precedence rules capable of defining which specification takes precedence between overlapping specifications.

The test case execution order is one of random, alphanumeric and undefined. A plurality of test management commands are used for the test execution engine. The test management commands are written syntactically in the same language as one of the test cases, as the arguments for the test execution engine at the command line, and in configuration files.

It is to be understood that both the foregoing general description and the following detailed description are exemplary and explanatory only, and are not restrictive of any claimed inventions. A first embodiment provides a test suite interface specification. The test suite interface specification comprises a test control parameter capable of controlling where in a code of a software application a test execution engine (TEE) continues execution of a test after a problem is detected in a test suite. The test control parameter is essentially capable of controlling the number of test cases executed.

The test suite interface specification also comprises a test order parameter capable of controlling a sequence of test cases in the codes of the software application. The test order parameter is essentially controlling the test execution order.

The test suite interface specification further comprises a test categories parameter capable of grouping test cases according to different criteria, where one test case can belong to one or more test categories. The test categories parameter, or test set operations parameter essentially is capable of selecting test cases. In the following, in the present document, the term "test category" refers to a set of test cases, and "test category operation" refers to operations on test categories, in particular test category intersection, test category union and test category complement.

The test suite interface specification further yet comprises a set of precedence rules capable of defining which specification takes precedence between overlapping specifications. Essentially the set of precedence rules is capable of defining the priority of overlapping specification. The Test Control parameter(s) may instruct the unit test execution engine that a parameterized test case, test suite or a test program (combining several test suites) shall stop or continue when either one of the following has occurred: after a test system error, the error being defined as a problem in the test system or test harness, or after a test case fail, the fail or fail event being defined as a problem in the test object.

In accordance with the meaning attributed to a Test Control parameter, the parameter may determine the number of test cases executed. The test control parameter is capable of controlling where in a sequence of test cases test execution engine (TEE) continues execution of a test after a problem is detected in a test suite.

The Test Control parameter exemplarily may take one of the following values:
StopOnFail, in which case the execution of the test suite stops after next fail case;
StopOnError, in which case the execution stops after next fail or error case;
ContinueOnFail, in which case the execution proceeds after next fail case; or
ContinueOnError, in which case the execution proceeds after next fail or error case.

In the art the default value for the test control parameter is ContinueOnError, because this is what current unit test execution engines do.

In order to distinguish errors from fail events or fails, the operation that calculates the test case verdict (Assert) distinguishes problems in the test system or test harness form problems in the test object. Therefore, the test suite comprises commands such as Assert(TO, . . . ), to detect problems in the (T)est (O)bject, Assert(TS, . . . ), to detect problems in the (Te)st (S)ystem or test harness, or Assert( . . . ), the same as Assert(TO, . . . ). In the art the default value is Assert( . . . ), since it reflects the current practice.

In some embodiments, the Test Order parameter(s) is capable of controlling a sequence of test cases in said codes of the software application or is capable of controlling the test execution order.

The Test Order parameter instructs the test execution engine on the order of the tests to be executed. The Test Order parameter can take one of the following values:

Random, in which case the test cases will be executed in random order;
Undefined, in which case the test cases will be executed in implementation-specific order; and
Alphanumeric, in which case the test cases will be executed in alphanumeric order.

The default value of the Test Order parameter is Undefined, since this reflects the current practice in the art.

In some embodiments, the test category operations refer to a set of operations for selecting test cases. A test category is capable of grouping test cases according to different criteria, where one test case can belong to one or more test categories.

Currently, test sets are combined either in test suites or by means of test categories. Here within, a test suite is considered as a special test category.

Logical operations allow the precise determination of test cases to be executed for fulfilling specific test goals like checking basic functionality by running all hardware-independent smoke tests, running all tests that belong to category SmokeTest and category HardwareIndependent.

The category operations when applied on test set categories, are semantically equal to operations on mathematical sets. Illustrated exemplarily in Table 1 are 4 test categories defined as follows:

TABLE 1

Test Cases falling into one or more Test Categories

| | | Test Categories | | | |
|---|---|---|---|---|---|
| | | A | B | C | D |
| Test Cases | TC1 | x | | x | |
| | TC2 | | x | | |
| | TC3 | x | | x | x |
| | TC4 | | x | x | |
| | TC5 | | x | x | |

Based on the above exemplary test case to test category assignment, the operations for selecting, restricting or extending test case sets (test category operations) are defined as follows:

Category_A OR Category_C, designated as category union, executes test cases from the category A and the test cases from the category C (TC1, TC3 and TC5 in table 1). Test cases that are assigned to both categories will be executed only once.

Category_A AND Category_B, designated as category intersection, executes test cases that are assigned both to categories A and to category B (represented via the empty set in table 1).

NOT Category_D, designated as category complement, executes test cases from categories A, B and C but not D (TC1, TC2, TC4 and TC5 in table 1).

NOT (Category_A AND Category_C), designated in the category combination, executes test cases that do not belong to categories A and C at the same time (TC2, TC4 and TC5 in table 1).

Further exemplary implementations of a test cases falling under one or more test categories will be provided in this document in connection with an exemplary embodiment.

Test management parameters can be defined on one of several levels ranging from test management parameters for test cases at the highest level to test management parameters for a complete set of test cases at the lowest level. Precedence rules define specification of a test management parameter takes precedence between specifications at different levels. Specifically the set of precedence rules are employed for defining the priority of overlapping specifications.

The Test Control parameters, Test Order parameters and Test category operations can be defined on one or several levels.

Referring now to FIG. 1, FIG. 1 represents Test Control parameters and Test Order parameters at various levels. As it may be seen illustrated in FIG. 1, values or operations defined on a higher level, such as 106 and 108, overwrite values or operations defined on a lower level, such as 102 or 104, because higher levels are closer to the test cases and hence more concrete than those defined on lower levels. In FIG. 1 via level 1 operation 102 is exemplarily understood as a test program configuration in XML, via level 2 value or operation 104 is understood as a test program, for example binarily executable, via level 3 operations are understood as a test suite 106 and via level 4 value or operation is exemplarily understood as a test case 108.

Values or operations defined on a higher level overwrite values or operations defined on a lower level because higher levels are closer to the test cases and hence more concrete than those defined on lower levels.

Values and operations can formally be specified in EBNF (extended Backus-Naur notation), since most programming language use EBNF (or BNF) to define the grammar of the language, as shown in the following example, by specifications on Levels 2 and 3. TP represents an arbitrary (T)est (P)rogram being controlled by a test execution engine (TEE).

Referring now to the content of table 2, in table is represented the syntax of the TestControl and TestOrder parameter syntax.

TABLE 2

Syntax of Test Control and test order parameters

| | Level | Syntax |
|---|---|---|
| 1 | 2 Command line | TP [ "/TestControl" ":" TestControlAttr ] TestSuite |
| 2 | | TP [ "/TestOrder" ":" TestOrderAttr ] TestSuite |
| 3 | | TP Tests |
| 4 | 2 Test program | [ "[" "program" ":" TestControl "(" TestControlAttr ")" "]" ] |
| 5 | | [ "[" "program" ":" TestOrder "(" TestOrderAttr ")" "]" ] |
| 6 | 3 Test Suite | "[" "TestFixture" [ "," TestControl "(" TestControlAttr ")" ] "]" |
| 7 | | "[" "TestFixture" [ "," TestOrder "(" TestOrderAttr ")" ] "]" |

Referring now to the content of table 3, in table is as well a representation the syntax of the TestControl and TestOrder parameter syntax, wherein the symbols employed in table 2 are defined as follows:

TABLE 3

Syntax of Test control and test order parameters

| Symbol | Syntax |
| --- | --- |
| TestControlAttr | = "StopOnError" \| "StopOnFail" \| "ContinueOnError" \| "ContinueOnFail" . |
| TestOrderAttr | = "Random" \| "Undefined" \| "Alphanumeric" . |
| Tests | = SimpleCategory [ "/or" SimpleCategory ] . |
| SimpleCategory | = Category { "/and" Category } . |
| Category | = TestCategory \| "/(" TestCategory "/) " \| [ "/not" ] TestCategory . |
| TestSuite | = Identifier . |
| TP | = Identifier . |
| TestCategory | = ("/TestCategory" \| "/TestSuite") ":" Identifier . |

In the above by "Identifier" is understood a name identifying a program or name identifying a test suite or test case.

A test execution engine (TEE) is understood as being a software, used to test software, to have a hardware implementation or complete system, or to be a combination of the two.

The test execution engine does not carry any information about the tested product. Only the test specification and the test data carry information about the tested product.

The test specification may be embodied as software. The test specification specifies the test sequence. A test sequence includes test procedures and test parameters, which together are referred to as test cases. Test management commands specify the test cases to be executed.

The test specification should be stored in the test repository in a text format (such as source code). Test data is sometimes generated by some text data generator tool. Test data can be stored in binary or text files. Test data should also be stored in the test repository together with the test specification.

Test specification is selected, loaded and executed by the test execution engine similarly, as application software is selected, loaded and executed by operation systems. The test execution engine should not operate on the tested object directly, but though plug-in modules similarly as an application software accesses devices through drivers which are installed on the operation system.

The difference between the concept of test execution engine and operation system is that the test execution engine monitors, presents and stores the status, results, time stamp, length and other information for every test procedure of a Test Sequence but typically an operation system does not perform such profiling of a software execution.

Via the test execution engine, the test results are stored in report files and can be viewed in a uniform way, independent of the type of the test, the test execution engine facilitates keeping track of the changes, and further facilitates to reuse components developed for testing that facilitated obtaining said test results.

In one embodiment, the test execution engine has at least the following functions:
  aids in the selection of the test cases type to execute. The selection can be automatic or manual;
  loads test specifications by opening a file from a local file system or by downloading a file from a server, depending on where the test specification is stored;
  executes the tests, shows the tests progress and accepts control from the operator (for example to abort the tests, presents the outcome (such as Passed, Failed or Aborted) of test steps and the complete sequence of testing to the operator;
  stores the test results in report files.

The test execution engine may also be an advanced test execution engine, that may have additional functions, such as stores the test results in a Database, loads test result back from the Database, presents the test results as raw data, presents the test results in a processed format (Statistics) and authenticates the operators.

Some embodiments also provide a method for testing a code of a software application by using test suites, the method comprising the steps of defining a plurality of testing goals and a testing strategy for the code of the software application, determining a plurality of objects under test within said code of a software application, designing a plurality of test cases, and a plurality of test suites for said defined testing strategy, defining a plurality of test categories for said designed plurality of test suites, defining a test execution sequence for said designed plurality of test suites and said plurality of test categories, defining whether a test execution sequence shall continue or stop after the occurrence of at least one of an error in a test object and a fail event in the test system, based on the results obtained in all the previous steps, parametrizing the a test automation framework with the test suites, running the test automation framework on said code of a software application, and analyzing the results obtained from running the test automation framework on said code of a software application.

Figure 2:
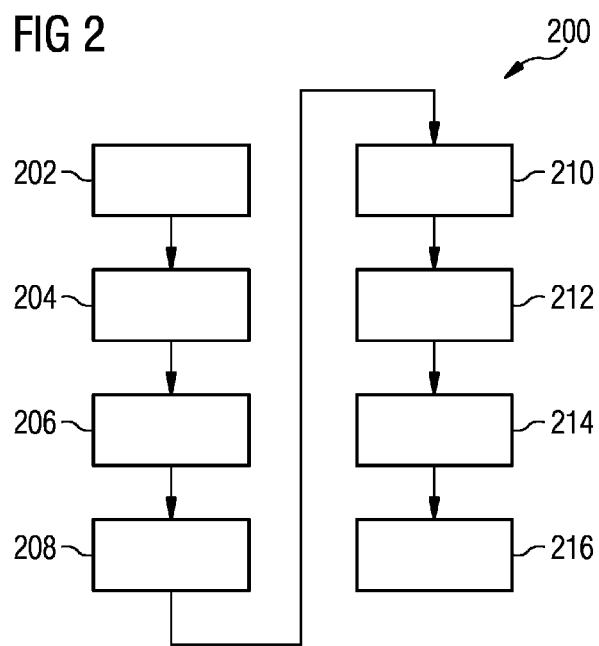
FIG. 2 illustrates flow chart of an example method for testing a code of a software application by using test suites, in accordance with an example embodiment.

The example method 200 will be discussed in detail with the aid of the flow chart illustrated in FIG. 2. Referring now to FIG. 2, FIG. 2 illustrates a method for testing software by using test suites.

In one embodiment, a method comprises at least the steps of defining 202 a plurality of testing goals and a testing strategy for the code of the software application subject to testing, determining 204 a plurality of objects under test within said code of a software application, designing 206 a plurality of test cases, and a plurality of test suites for said defined testing strategy, defining 208 a plurality of test categories for said designed plurality of test suites, defining 210 a test execution sequence for said designed plurality of test suites and said plurality of test categories, defining 212 whether a test execution sequence shall continue or stop after the occurrence of at least one of an error in a test object and a fail event in the test system, based on the results obtained in all the previous steps, parametrizing 214 the a test automation framework with the test suites, runnig 216 the test automation framework on said code of a software application, and analyzing 218 the results obtained from running the test automation framework on said code of a software application. The above summarized test method will be further discussed in more detail in connection with an exemplary implementation of the method that will be further illustrated in FIG. 3 of the present document.

In accordance with the method for testing a code of a software application by using test suites, the test automation framework may employ a test control parameter capable of controlling where in a code of a software application a test execution engine (TEE) continues execution of a test after a problem is detected in a test suite. Further in some embodiments the test automation framework may employ a test order parameter capable of controlling a sequence of test cases in the codes of the software application. Further yet, in accordance with the method for testing a code of a software application by using test suites, the test automation framework may employ a test categories parameter capable of grouping test cases according to different criteria, where one test case can belong to one or more test categories. The test automation framework may employ a set of precedence rules capable of defining which specification takes precedence between overlapping specifications.

In one embodiment, the test execution engine is implemented only once and hence the test developer is relieved from writing imperative, error prone test code saving the test developer considerable amount of development and debugging time.

The TestControl parameter, TestOrder parameter and Test set operations employed by the test execution engine are purely declarative, easy to write, easy to read, and easy to verify means based on commonly know concepts (attributes, sets) for controlling a test execution engine. Further, the parameters relieve test developers from writing error prone, non-standardized imperative test control statements. The parameters simplify considerably the adaptation of test suites to specific test purposes, e.g. test only functionality of basic features during development phases but test all features on all platforms during weekly integration test and for a product release. The parameters can easily be integrated with test management tools through their declarative nature either on the command line interface of the test program or by means of standardized XML files (Test program configuration) thus reducing integration problems and effort.

The solutions disclosed herein may help to avoid the domino-effect errors that result from errors by advising to stop a test suite or a complete test run. The solutions disclosed herein may improve error management, due to running only the test cases useful and necessary to reach a specific test goal. The solutions disclosed herein may simplify considerably the test result analysis and debugging due at least to reduced test logs and hence better orientation, and overview of the test result data, and differentiating the test object from errors in the test system.

The solutions disclosed herein may facilitate to save resources, in particular test execution time and machine times (duration a machine is block executing tests). The solutions disclosed herein may be applied flexibly due to being fully downward compatible with current approaches, since they refer to the default values and operations. The parameters disclosed herein may be easily be extended syntactically by adding new values to the parameters TestControl and TestOrder or new operators to the Test set operations parameter.

The systems and methods disclosed herein may enable test result (file) comparisons during regressions tests across different test unit tools/frameworks and different variants of the same unit test tool/framework provided that the test suites are executed in defined, (alphanumeric) order.

The considerably reduced test execution time does shorten the development feedback cycles. Hence, unit tests can be performed more often. This in turn does considerably streamline the development process as well as test and maintenances process and hence improves the quality of the test object (product) while reducing product release time and total costs of ownership.

In an exemplary embodiment, an example run of a test program is described. The exemplary test program comprises of 9 test cases allocated to 3 test suites and 4 test categories. The test suites are just special test categories of test cases, with each test case being a member of exactly only one test suite.

As can be seen in table 4, test case 2 of test suite X (TC_X2) signals a problem in the test object and test case 3 of test suite Y (TC_Y3) will signal a problem in the test system or test harness:

TABLE 4

Test Cases falling into one or more Test Categories

|  |  | Test run | Test Suites | | | Test Categories | | | |
| --- | --- | --- | --- | --- | --- | --- | --- | --- | --- |
|  |  |  | X | Y | Z | A | B | C | D |
| Test Cases | TC_X1 |  | x |  |  | x |  | x |  |
|  | TC_X2 | fail | x |  |  |  | x |  |  |
|  | TC_X3 |  | x |  |  | x |  | x | x |
|  | TC_Y1 |  |  | x |  |  | x |  |  |
|  | TC_Y2 |  |  | x |  |  | x | x |  |
|  | TC_Y3 | error |  | x |  |  | x |  |  |
|  | TC_Z1 |  |  |  | x |  |  |  |  |
|  | TC_Z2 |  |  |  | x |  |  |  |  |
|  | TC_Z3 |  |  |  | x | x |  | x | x |

Table 5 illustrates possible test execution sequences applicable to the above example. The test execution engine executes the tests as follows:

TABLE 5

Test execution sequences for test cases specified in Table 4.

|  | $L^1$ | Given: Specification | Result: |
| --- | --- | --- | --- |
| 1a | 2 | TP | TEE executes all 9 test cases in undefined order. |
| 1b | 2 | TP /TestControl : ContinueOnError |  |
| 2 | 2 | TP /TestControl : StopOnFailure | TEE might execute all test cases (worst case) or might stop after first test case (best case), in case of TEE implementation schedules TC_X2 first. |
| 3 | 2 3 | TP /TestOrder: Alphanumeric [TestFixture, TestControl (StopOnError) ] TestSuite X { . . . } | TEE executes 8 test cases. Test Suite X is stopped after TC_X2. TEE continues with TC_Y1. TC_Y3 does not stop TEE from executing tests because Y is by default declared as ContinueOnError. |
| 4 | 2 | TP /TestOrder: AlphaNumeric /TestControl: StopOnFail | TEE executes 2 of 9 test cases and stops after TC_X2 |
| 5 | 2 | TP /TestOrder: AlphaNumeric /TestControl: StopOnError | TEE executes 6 of 9 test cases and stops after TC_Y3 |
| 6 | 2 | TP /TestOrder: AlphaNumeric /TestControl: StopOnError /TestCategory:B /or /TestCategory:D | TEE executes 5 of 6 selected test cases in order TC_X2, TC_X3, TC_Y1, TC_Y2, and TC_Y3 TC_Y3 stops TEE because of a fatal error in the test system. |
| 7 | 2 | TP /TestOrder: AlphaNumeric /TestControl: StopOnFail /TestCategory:B /or /TestCategory:D | TEE executes 1 of 6 selected test cases. TEE stops after detecting a fault in the test object in the first test case TC_X2 |
| 8 | 2 | TP /TestOrder: AlphaNumeric /TestControl: StopOnError /TestCategory: B/and /TestCategory: D | TEE executes no test case. |
| 9 | 2 | TP /TestOrder: AlphaNumeric /TestControl: StopOnFail /TestSuite:X /and | TEE executes 1 of 1 selected test case TC_X2. If more test cases of test suite X |

TABLE 5-continued

Test execution sequences for test cases specified in Table 4.

| Given: | Result: |
|---|---|
| TestCategory: B | would belong to category B (TC_X4, TC_X5 . . . ), TEE would not execute them because of the first test failing. |

Wherein L=Specification at Level L, L∈(1, 2, 3, 4), TC is a test case, TEE is a test execution engine.

Another example embodiment is discussed below, regarding specifying TestControl and TestOrder on Levels 3 and 4.

The following example is demonstrated for a C# application. Therefore [program: . . . ] is replaced with the C# specific concept [assembly: . . . ].

```
01:    [assembly:TestOrder(Alphanumeric)]
02:
03:    [TestFixture, TestControl(StopOnFail)]
04:    public class W
05:    {
06:        ...
07:    }
08:
09:    [TestFixture, TestControl(StopOnError)]
10:    public class X
11:    {
12:        ...
13:    }
14:
15:    [TestFixture]
16:    public class Y
17:    {
18:        ...
19:        [Test, TestControl(StopOnFail)]
20:            public void TC_Y5( ) { ... }
21:        ...
22:    }
23:
24:    [TestFixture]
25:    public class Z
26:    {
27:        ...
28:    }
```

The above is a listing, Listing 1, that specifies TestControl and TestOrder parameters in test code.

Line 01 of the listing is indicative that all tests are performed in alphanumeric order. Alternatively, write on the command line: TP /TestOrder:AlphaNumeric.

Line 03 of the listing is indicative that the TEE stops the execution of test suite W in case of one of the test cases detecting a problem in the test object and continues with test X.

Line 09 is indicative that the TEE stops the execution of test suite X in the case when only one of the test cases detects a problem in the test object or a problem in the test system is detected. The TEE continues with test suite Y.

Line 19 is indicative that the TEE stops test suite Y after test case TC_Y5 in case TC_Y5 detects a problem in the test object. TEE continues with test suite Z because of the complete test suite is executed in alphanumerical order (line 3).

Line 24 is indicative that the TEE executes all test cases of test suite Z is alphanumeric order as specified by default on line 01.

Some embodiments provide a computer program product usable for testing software by using test suites, comprising a computer useable medium including a computer readable program, wherein the computer readable program includes a functional component that when executed on a computer causes the computer to perform the steps of defining a plurality of testing goals and a testing strategy for the code of the software application, determining a plurality of objects under test within said code of a software application, designing a plurality of test cases, and a plurality of test suites for said defined testing strategy, defining a plurality of test categories for said designed plurality of test suites, defining a test execution sequence for said designed plurality of test suites and said plurality of test categories, defining whether a test execution sequence shall continue or stop after the occurrence of at least one of an error in a test object and a fail event in the test system, based on the results obtained in all the previous steps, parametrizing the a test automation framework with the test suites, running the test automation framework on said code of a software application, and analyzing the results obtained from running the test automation framework on said code of a software application.

The functional component may be a test automation framework (TAF) for controlled execution of test suites.

Figure 3:
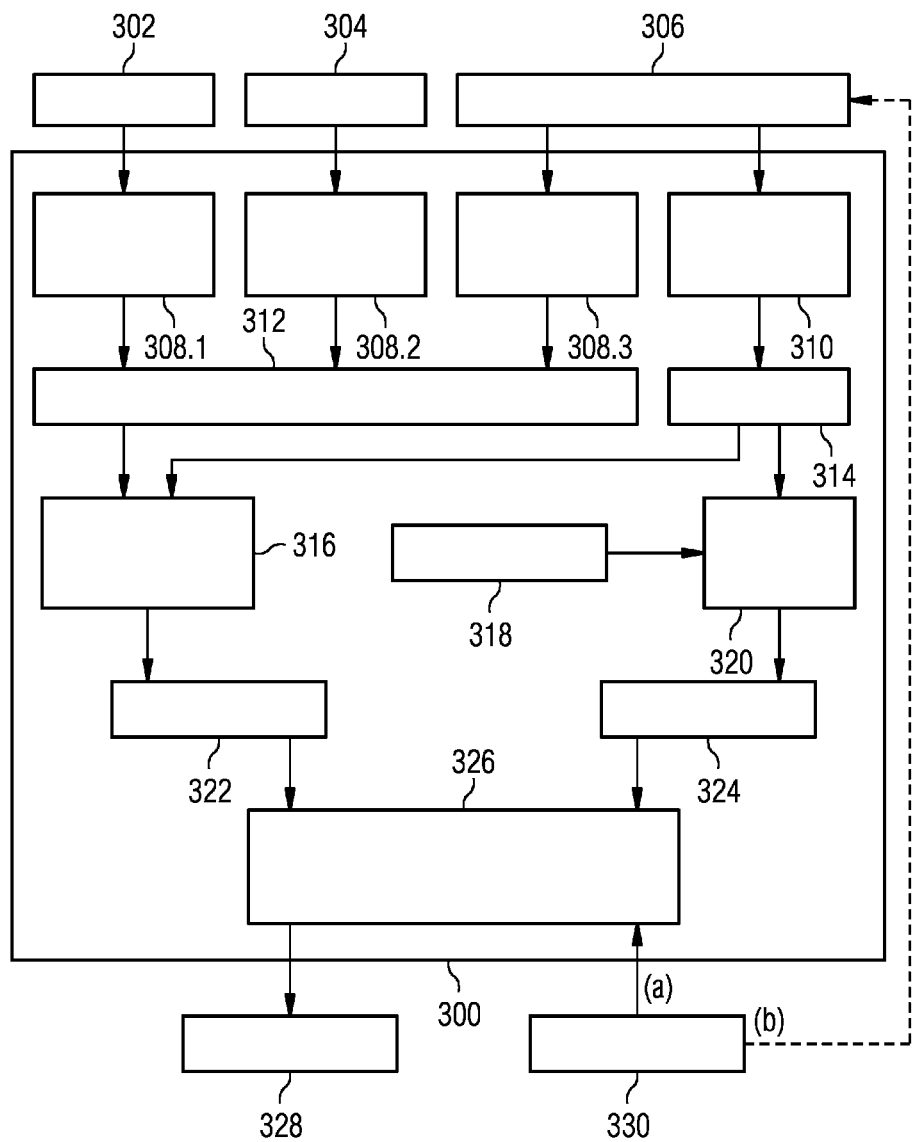
FIG. 3 illustrates a data flow diagram of an example test automation framework including controlled test suite execution, in accordance with an example embodiment.

Referring now to FIG. 3, FIG. 3 illustrates a data flow diagram of a rest automation framework including controlled test suite execution.

The data flow diagram in FIG. 3 sketches the processes (P1 to P5) and data stores (D1 to D8) which together constitute a test automation framework including controlled test suite execution (TAF) 300. Previously in the present document the TAF has been referred to as well by TP. In the present document denominations TP and TAF are used interchangeably, and are assigned the same meaning.

As it will be discussed in detail in the following, the TAF 300 may comprise new parts and modified parts currently not comprised by the currently available unit test automation frameworks.

The TAF 300 comprises the following processes, with the following responsibilities:

Process 308.1 Extracts and transforms control parameters provided at the test program's command line 302 into a uniform, normalized format 312.

Process 308.2 Extracts and transforms control parameters provided in the test program's configuration file 304, for example in XML syntax into a uniform, normalized format 312.

Process 308.3 Extracts and transforms control parameters specified as attributes in the source code of the test program 306 into a uniform, normalized format 312.

Process 310 Extracts test procedures (operations marked with attribute Test, see above Listing 1, line 20) and, if necessary, transforms test procedures into a binary (executable) representation. Test programs written in C# (also used in Listing 1) support test procedure extraction by means of program metadata and reflection. Test programs written in languages not supporting attributes and program metadata, like C++, must be parsed and compiled.

Process 316 Selects the test procedures to be executed depending on whether they fall into the set of test categories specified either at the line, in the configuration file or in the test program. If specified, the selected test procedures and test suites are ordered and tagged with label indicated whether a failing test procedure stops either the execution of the containing test suite or the execution of complete test sequence.

Process 320 Links the executable test procedures 314 to the TEE 318 which controls the execution of test cases and test suites.

Process 326 The binary program executes lists of test cases (combinations of test procedures and test data rows) based on a test execution plan 322. A failing test case either skips the remaining test cases of the same test suite and continues with the first test case of the test suite scheduled next, or stops the complete test sequences.

Table 6: Responsibilities of TAF processes, as depicted in FIG. 3.

The TAF data stores, like 302, 304, 306, etc. FIG. 2, contain the following data:

Data store 302 Test control parameters specified as arguments on the program's command line.

Data store 304 Test control parameters specified in the test program's configuration file.

Dada store 306 Program source code of a test module containing
 (a) test control parameters (see Listing , lines 03, 09 and 20) and
 (b) test procedures (see Listing 1, line 21).

Data store 312 Test control parameters in a uniform, normalized format.

Data store 314 Binary representations of test procedures (sequence of test statements as well test-setup procedures and test-teardown procedures.

Data store 318 The precompiled test execution engine (TEE).

Data store 322 List of test procedures ordered by test suites which belong to the set of test categories selected by the test control parameters. The test procedures are ordered, if specified by test control parameters. The test plan specifies for very test procedure and every test suite whether the test suite a test procedure or the complete test sequence shall be continued or shall be stopped after a test case (test procedure and associated test data set) fails.

Data store 324 Binary representations of test procedures linked with binary representation of TEE.

Data store 330 Test data parameterizing a test procedure where each combination of a test data row with a test procedure forms a test case.
 (a) in FIG. 3: Data flow during test execution. TEE supplies test data row by row to a test procedure.
 (b) in FIG. 3: Data flow (conceptual) during design. Test procedure (source code) accesses test data, row by row.

Data store 328 Test results produced by a test case (combination of a test procedure and a test data row) and test statistics test cases test suites selected, succeeded and failed, total runtime etc.

Table 7: Contents of TAF data stores, as depicted in FIG. 2

The systems and methods disclosed herein may facilitate the differentiation of problems in objects under test and problems in test system (called errors in this document), and the possibility to continue or stop parts of a test suite/test sequence or the complete test suite/test sequence. As a result they reduce considerably the problem localization and test execution time.

The systems and methods disclosed herein may aid in avoiding domino-effects, by minimizing after-effects and side effects, due to easy test case selection and stopping of test sequences when there is no reason, after a fundamental problem, for continuing the test sequence.

The systems and methods disclosed herein may be intuitive, and use known syntax for the specification of Test Control commands, Test Order commands, and Test Sets, such as Command line parameters, Table 5, Attributes in source code, Listing 1, XML possible for configuration files, FIG. 3, 304. As a result the learning curve is reduced.

The systems and methods disclosed herein may facilitate that test management commands (Comprising Test control, Test order and Test category selection) can be written in the same language (same syntax) as the test cases, facility which again, reduces learning curve.

The systems and methods disclosed herein may provide flexible specification of Test Control commands, Test Order commands, Test Sets at different levels.

The systems and methods disclosed herein may provide defined test execution orders that enable comparison of test results of test runs with different TAF versions.

The Test control, Test order and Test sets may be specified so that existing TAF execution semantics are completely covered (fully downwards compatible).

Some embodiments provide an electronic data processing system for testing software by using test suites, comprising a functional component. The functional component, that may be implemented as a test execution engine performing the steps of defining a plurality of testing goals and a testing strategy for the code of the software application, determining a plurality of objects under test within said code of a software application, designing a plurality of test cases, and a plurality of test suites for said defined testing strategy, defining a plurality of test categories for said designed plurality of test suites, defining a test execution sequence for said designed plurality of test suites and said plurality of test categories, defining whether a test execution sequence shall continue or stop after the occurrence of at least one of an error in a test object and a fail event in the test system, based on the results obtained in all the previous steps, parametrizing the a test automation framework with the test suites, running the test automation framework on said code of a software application, and analyzing the results obtained from running the test automation framework on said code of a software application.

As it will be apparent for a person of ordinary skill in the art, the test case specifications and test management parameters can be described in software or, perhaps, in a separate description file. Some embodiments disclosed herein are implemented in software, which includes but is not limited to firmware, resident software, microcode, etc.

Some embodiments disclosed herein are embodied as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Many modifications and other embodiments of the embodiments disclosed herein are evident to one of ordinary skill in the art, having the benefit of the teachings presented in the foregoing description; and it will be apparent to those of ordinary skill in the art that variations and modifications of the embodiments disclosed herein can be made without departing from the scope or spirit of the present disclosure. Therefore, it is to be understood that the disclosure is not to be limited to the specific embodiments disclosed herein, and that modifications and other embodiments are intended to be included within the scope of the appended claims. Although specific terms are employed herein, they are used in a generic and descriptive sense only and not for purposes of limitation.

What is claimed is:

1. A method for testing software using test suites, the method comprising:
    defining a plurality of testing goals and a testing strategy for the software;
    determining a plurality of objects under test within said software;
    designing a plurality of test eases, and a plurality of test suites for said defined testing strategy;
    defining a plurality of test categories for said designed plurality of test suites;
    generating a test automation framework for executing said designed plurality of test suites defining:
        a test execution sequence for said designed plurality of test suites, and said defined plurality of test categories; and
        for each of said plurality of test suites, test continuation rules defining whether the test execution sequence, upon an occurrence of at least one of an error in a test object and a fail event in the test system during execution of that test suite, shall (a) terminate execution of the remaining test sequence for the remainder of that test suite and any remaining test suites to be executed, (b) terminate execution of the remainder of that test suite but continue with execution of the next test suite in the test execution sequence, or (c) continue execution of that test suite despite the error or fail event;
    wherein different test continuation rules are defined for at least two of the test suites in the plurality of test suites in the test automation framework;
    running the test automation framework on said software under test, and
    analyzing the results obtained from running the test automation framework on said software.

2. The method of claim 1, wherein said test automation framework. employs a test control parameter capable of controlling where in the software a test execution engine (TEE) continues execution of a test after a problem is detected in a test suite of said plurality of test cases.

3. The method of claim 1, wherein said test automation framework employs a test order parameter capable of controlling a sequence of test cases in software, 4. The method of claim 1, wherein said test automation framework employs a test categories parameter capable of grouping test cases according to different criteria, where one test ease can belong to one or more test categories.

5. The method of claim 1, wherein said test automation framework employs a set of precedence rules capable of defining which specification takes precedence between overlapping testing specifications.

6. A computer program product usable for testing software by using test suites, comprising:
    a non-transitory computer readable medium storing a computer readable program,
    wherein the computer readable program is executable by a processor to perform the steps of:
        defining a plurality of testing goals and a testing strategy for the software;
        determining a plurality of objects under test within said software;
        designing a plurality of test cases, and a plurality of test suites for said defined testing strategy;
        defining a plurality of test categories for said designed plurality of test suites;
        generating a test automation framework for executing said designed plurality of test suites defining:
            a test execution sequence for said designed plurality of test suites, and said defined plurality of test categories; and
            for each of said plurality of test suites, test continuation rules defining whether the test execution sequence, upon an occurrence of at least one of an error in a test object and a fail event in the test system during execution of that test suite (a) terminate execution of the remaining test sequence for the remainder of that test suite and any remaining test suites to be executed, (b) execution of the remainder of that test suite but continue with execution of the next test suite in the test sequence, or (c) continue execution of the test suite despite the error or fail event:
        wherein different test continuation rules are defined for at least two of the test suites in the plurality of test suites in the test automation framework;
        running the test automation framework on said software under test, and
        analyzing the results obtained from running the test automation framework on said software.

7. The computer program product of claim 6, wherein said functional component is a test execution engine (TEE) for controlled execution of test suites.

8. The computer program product of claim 7, wherein said test execution engine comprises at least test control parameters.

9. The computer program product of claim 8, wherein said test execution engine is capable of executing test cases in a sequence defined in test execution plans.

* * * * *